(12) United States Patent
Dale (10) Patent No.: US 9,342,882 B2
(45) Date of Patent: May 17, 2016

(54) METHODS AND SYSTEMS FOR DETERMINING THE CONCENTRATION OF A CONTRAST AGENT

(71) Applicant: Brian Dale, Morrisville, NC (US)

(72) Inventor: Brian Dale, Morrisville, NC (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 255 days.

(21) Appl. No.: 14/019,605

(22) Filed: Sep. 6, 2013

(65) Prior Publication Data

US 2014/0064589 A1    Mar. 6, 2014

Related U.S. Application Data

(60) Provisional application No. 61/697,325, filed on Sep. 6, 2012.

(51) Int. Cl.
   *G06T 7/00* (2006.01)
(52) U.S. Cl.
   CPC ..... *G06T 7/0016* (2013.01); *G06T 2207/10088* (2013.01); *G06T 2207/10104* (2013.01); *G06T 2207/30004* (2013.01)

(58) Field of Classification Search
   USPC .................................................. 382/128–134
   See application file for complete search history.

(56) References Cited

U.S. PATENT DOCUMENTS

| | | | | |
|---|---|---|---|---|
| 2004/0260170 A1* | 12/2004 | Wood et al. | ................... | 600/410 |
| 2008/0108894 A1* | 5/2008 | Elgavish et al. | .............. | 600/420 |
| 2011/0148861 A1* | 6/2011 | Boellaard | ..................... | 345/419 |

* cited by examiner

*Primary Examiner* — Alex Liew
(74) *Attorney, Agent, or Firm* — Peter R. Withstandley (57) ABSTRACT

A method for determining a concentration of a contrast agent in imaging data includes calculating a pre-contrast attenuation map of a region of interest of a patient. Following an administering of a contrast agent to the patient, a post-contrast attenuation map of the region of interest of the patient is calculated. An increase in attenuation value is determined based on the pre-contrast attenuation map and the post-contrast attenuation map and a contrast agent concentration map is calculated for the region of interest based on the increase in attenuation value.

16 Claims, 6 Drawing Sheets

METHODS AND SYSTEMS FOR DETERMINING THE CONCENTRATION OF A CONTRAST AGENT

CROSS-REFERENCE TO RELATED APPLICATIONS

This application claims priority to U.S. provisional application Ser. No. 61/697,325 filed Sep. 6, 2012, which is incorporated herein by reference in its entirety.

TECHNOLOGY FIELD

The present invention relates generally to methods, systems, and apparatuses for determining a concentration of a Magnetic Resonance Imaging contrast agent using, for example, concurrent Magnetic Resonance/Positron Emission Tomography image data. The disclosed methods, systems, and apparatuses may be applied to provide a non-invasive measure of contrast agent concentration which is independent of MR data.

BACKGROUND

In Magnetic Resonance Imaging ("MRI"), a substance known as a contrast agent is used to enhance the contrast of structures or fluids within the patient's body. The contrast agent is MRI administered by injection into the patient's blood stream or orally, depending on the area of the body being scanned. After the contrast agent is administered, it is often desirable to determine the concentration of the contrast agent within the patient. This information can be useful on its own, or as input to determine other quantities, such as perfusion.

Conventional systems that determine the concentration of an MRI concentration agent may be broadly classified into non-invasive and invasive categories. Systems in the non-invasive category are reliant on MR image data and suffer from a lack of a baseline to compare data for independent validation. As a result, non-invasive systems are susceptible to bias and are sensitive to subtle errors and artifacts in MR images. Conversely, systems in the invasive category provide an independent validation using MR-only data, enhancing accuracy and reliability. However, these systems require the cost of risk, expense, and difficulty associated with invasive measurements. It would be desirable to have a non-invasive measure of contrast agent concentration which is independent of MR data.

SUMMARY

Embodiments of the present invention address and overcome one or more of the above shortcomings and drawbacks, by providing methods, systems, and apparatuses which determine a concentration of a contrast agent in imaging data. This technology is particularly well-suited for, but by no means limited to, hybrid imaging systems which concurrently acquire Magnetic Resonance (MR) and PET (Positron Emission Tomography) image data Embodiments of the present invention are directed to a method for determining a concentration of a contrast agent in imaging data. The method includes calculating a pre-contrast attenuation map of a region of interest of a patient. Following an administering of a contrast agent to the patient, a post-contrast attenuation map of the region of interest of the patient is calculated. An increase in attenuation value is determined based on the pre-contrast attenuation map and the post-contrast attenuation map and a contrast agent concentration map is calculated for the region of interest based on the increase in attenuation value. In some embodiments, calculating the contrast agent concentration map for the region of interest comprises multiplying the increase in attenuation value by a mass attenuation coefficient corresponding to the contrast agent.

According to one aspect of the present invention, as described in some embodiments, the aforementioned method may further comprise adjusting the post-contrast attenuation map to account for one or more systematic differences.

In one embodiment, the aforementioned method further comprises determining a decay corresponding to PET radiotracer activity following the calculation of the pre-contrast attenuation map and adjusting the post-contrast attenuation map based on the decay.

In another embodiment, the method further comprises determining whether a PET radiotracer tracer has reached a steady-state biological distribution in the patient prior to the pre-contrast attenuation map and, if the PET radiotracer tracer has not reached a steady-state biological distribution, adjusting post-contrast attenuation map to reflect the change in biological distribution between the pre- and post-contrast attenuation maps. Determining whether the PET radiotracer tracer has reached the steady-state biological distribution may be performed, for example by acquiring first PET tracer kinetics prior to the administering of the contrast agent to the patient, acquiring second PET tracer kinetics after the administering of the contrast agent to the patient, and determining whether the PET radiotracer tracer has reached the steady-state biological distribution by comparing the first PET tracer kinetics with the second PET tracer kinetics.

In yet another embodiment, the aforementioned method further comprises determining whether the patient moved between the calculating of the pre-contrast attenuation map and the calculating of the post-contrast attenuation map; and if the patient moved between the calculating of the pre-contrast attenuation map and the calculating of the post-contrast attenuation map, adjusting post-contrast attenuation map using a motion correction technique.

In some embodiments, the aforementioned method for determining a concentration of a contrast agent in imaging data further comprises overlaying a concentration map on at least one of a PET image and an MR image. This overlaying may utilize, for example, user-selectable visual attributes comprising at least one of a color scale, highlighting, and shading.

Other embodiments of the present invention are directed to a system for determining the concentration of a contrast agent in imaging data. The system comprises an input data processor and an image data processor. The input data processor is configured to generate a first attenuation data prior to an administering of the contrast agent in a patient's body, wherein the first attenuation data comprises a plurality of picture elements. Second attenuation data is generated after the administering of the contrast agent in the patient's body. The image data processor is configured to determine a contrast agent concentration associated with at least one of the picture elements based on the first attenuation data and the second attenuation data. In one embodiment, the image data processor is configured to determine the contrast agent concentration by multiplying a difference between first attenuation data and second attenuation data for the at least one individual picture elements by a factor representing attenuation of the contrast agent.

According to one aspect of the present invention as presented in some embodiments, the image data processor in the aforementioned system is further configured to correct at least one of the first attenuation data and the second attenuation data in response to data representing PET radioactive trace element decay. In other embodiments, the image data processor is further configured to receive data representing patient movement and correct at least one of the first attenuation data and the second attenuation data based on the data representing patient movement.

According to another aspect of the present invention as presented in some embodiments, at least one of the first attenuation data and the second attenuation data in the aforementioned system is estimated in response to acquiring at least one of (a) MR image data and (b) PET image data. In some embodiments, the second attenuation data is corrected based on at least one of: (i) data representing PET radioactive trace element decay; (ii) data representing PET radioactive trace element movement; and (iii) data representing patient movement.

In some embodiments, the aforementioned system further comprises a display processor configured to generate a map comprising the determined contrast agent concentration for said the plurality of individual picture elements. This display processor may be further configured to provide the map as an overlay for presentation in combination with at least one of a PET image and an MR image.

Other embodiments of the present invention are directed to a an article of manufacture for determining concentration of a contrast agent in imaging data, the article of manufacture comprising a non-transitory, tangible computer-readable medium holding computer-executable instructions for performing a method. The method includes calculating a pre-contrast attenuation map of a region of interest of a patient. Following an administering of a contrast agent to the patient, a post-contrast attenuation map of the region of interest of the patient is calculated. An increase in attenuation value is determined based on the pre-contrast attenuation map and the post-contrast attenuation map and a contrast agent concentration map is calculated for the region of interest based on the increase in attenuation value. In some embodiments, calculating the contrast agent concentration map for the region of interest comprises: multiplying the increase in attenuation value by a mass attenuation coefficient of the contrast agent. In some embodiments, the method further comprises adjusting the contrast agent concentration map for one or more systematic differences.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION OF ILLUSTRATIVE EMBODIMENTS

The following disclosure describes the present invention according to several embodiments directed at determining a concentration of a contrast agent using concurrent MR-PET (Positron Emission Tomography) image data. More specifically, the change in attenuation of the concurrently acquired PET data is used to measure the concentration of the contrast agent in a patient's body. The invention is particularly well suited to hybrid imaging systems that simultaneously perform a PET scan and an MRI scan. However, one skilled in the art would recognize that the general techniques described herein may also be extended to other imaging systems where PET scanning and MRI scanning are performed independently.

Figure 1:
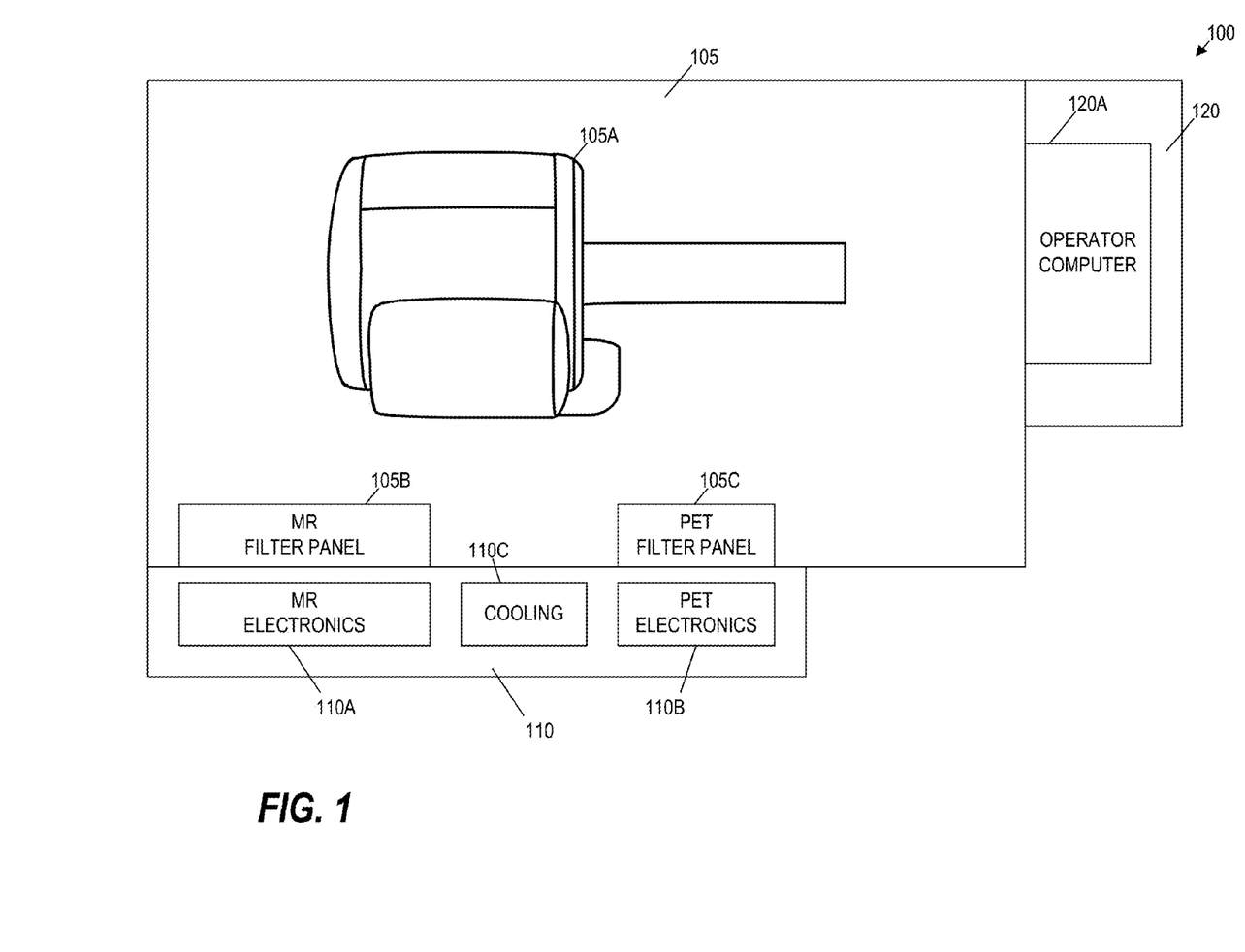
FIG. 1 is a diagram of a hybrid imaging system used in some embodiments of the present invention.
Figure 2:
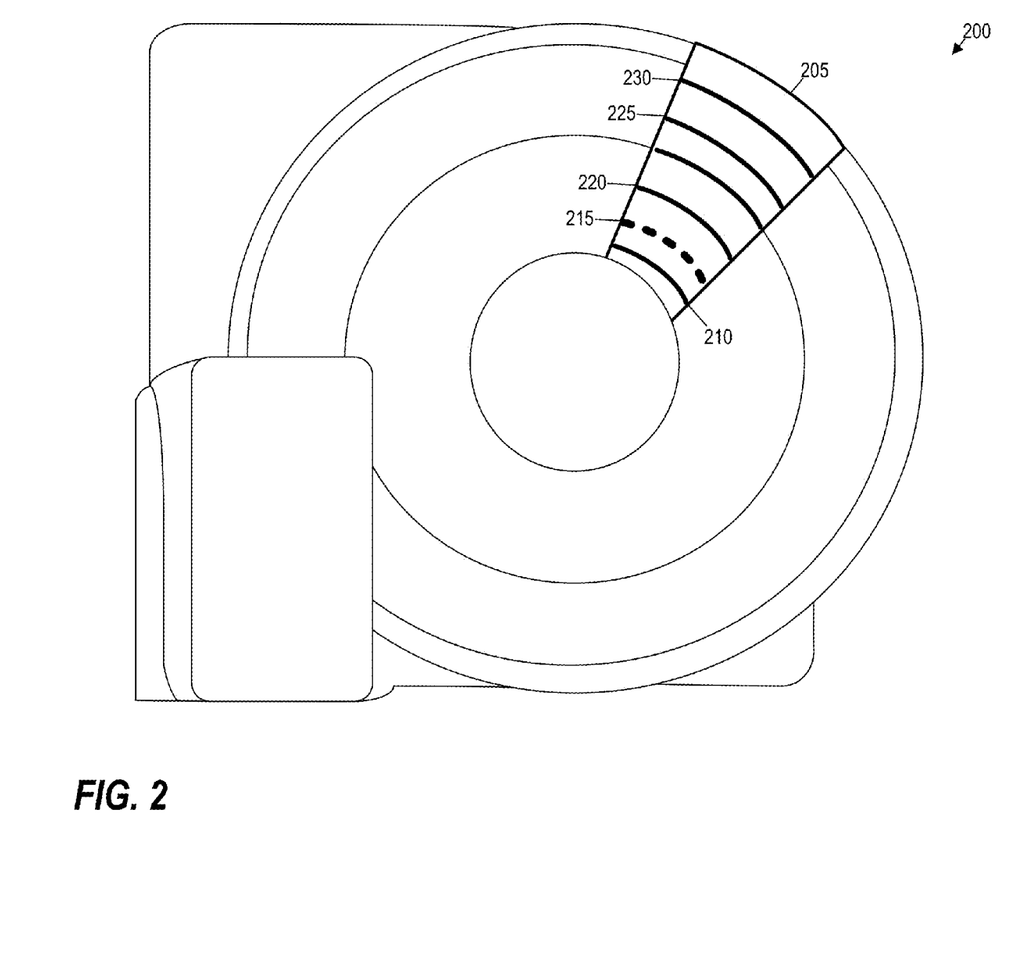
FIG. 2 provides an illustration of an example configuration for a hybrid imaging device, as used in some embodiments of the present invention.

FIG. 1 is a diagram of a hybrid imaging system 100 used in some embodiments of the present invention. The system 100 includes a hybrid imaging device 105A situated in a system room 105. The device 105A integrates the MR and the PET imaging modality into single device and may be configured in various ways to integrate PET detectors and MR hardware. FIG. 2 provides an illustration 200 of an example configuration for a hybrid imaging device, as used in some embodiments of the present invention. The illustration includes a cutaway 205 showing the various components of the device in a side-view. These components include, from inside to out, an RF body coil 210, a PET detector 215, a gradient coil assembly 220, a primary magnet coil 225, and a magnet shielding coil 230. Because the device must perform both MR and PET imaging, the components may be designed to reduce interferences between the two modalities. For example, the PET detector 215 is able to work within the strong magnetic fields required without disturbing those fields, as well as RF transmission or reception. Similarly, the RF body coil 210 can be designed to minimize attenuation of energy detected by the PET detector 215.

Continuing with reference to FIG. 1, a technical equipment room 110 holds various items required to process information from the hybrid imaging device. An MR electronics cabinet 110a may hold computers for MR-related tasks such as signal processing and reconstruction. Similarly, another second cabinet 110B may hold PET electronics. In some embodiments, the various components of the MR electronics cabinet 110A and the PET electronics cabinet 110B are combined into a single cabinet (not shown in FIG. 1). Cooling infrastructure 110C may be shared for both the MR system and for the PET detectors. Filter panels 105B and 105C feed the MR/PET signals and their respective associated cables through the wall between the system room 105 and the technical equipment room 110. The system 100 may also include an operator control room 120 adjacent to the system room 105, where an operator can control the various components of the system via an operator computer 120A.

Other examples of systems which combine PET and MRI scanning devices are described generally in U.S. patent application Ser. No. 11/532,665, filed Sep. 18, 2006 and entitled Combined PET/MR Imaging System and APD-Based PET Detector For Use In Simultaneous PET/MR Imaging," the entirety of which is incorporated herein by reference. Additionally, it should be noted that a hybrid imaging device is not necessarily required to practice the invention disclosed herein. For example, in some embodiments, separate MR and PET imaging systems may be used.

PET is a nuclear medical imaging technique that involves the use of a PET scanner and a radiotracer (e.g., 18F-fluorodeoxyglucose) that is injected into a patient's bloodstream. Once injected, the radiotracer accumulates in the patient's tissues and organs. Then, as the radiotracer naturally decays, it emits positions. The positions react with electrons in the body in a process called "annihilation" to create pairs of high-energy photons. The PET scanner is able to detect these photons and create an image showing how the radiotracer is distributed in the body. The photons generated by the annihilation process can also be absorbed by tissue, particularly bone which has a high X-ray absorption. This absorption is referred to herein as attenuation. Attenuation of the high energy photons is the primary mechanism of contrast for other imaging modalities, such as X-ray and Computed Tomography ("CT"), but it is an undesirable artifact for PET imaging.

In order to illustrate the artifact of attenuation, PET imaging devices (e.g., device 105A) can generate an attenuation map, also referred to as a or μ map. The attenuation map provides a spatial distribution of attenuation throughout the body that can be used to correct for the absorption of the photons emitted from decay. This map may be represented as a group of picture elements such as pixels or voxels, depending on the type of data (e.g., two dimensional versus three-dimension) being analyzed by the imaging device. The attenuation maps used in various embodiments of the present invention may be derived using any technique known in the art including, without limitation, transmission scanning, model or atlas-based approaches, x-ray CT segmented T1-weighted MR imaging, or more advanced MR imaging-guided derivations techniques A PET signal is sensitive to both MR contrast agents and PET radiotracers; however, their respective effect on the PET data is different. Specifically, radiotracers increase the PET signal, while MR contrast agents increase the attenuation of the PET signal. Thus, during the concurrent acquisition of MR and PET data, if an MRI contrast agent is administered, the attenuation of the PET photons will depend not only on the tissue, but also on the concentration of the contrast agent in the tissue. This dependency may be used to calculate the concentration of a MR contrast agent.

Figure 3:
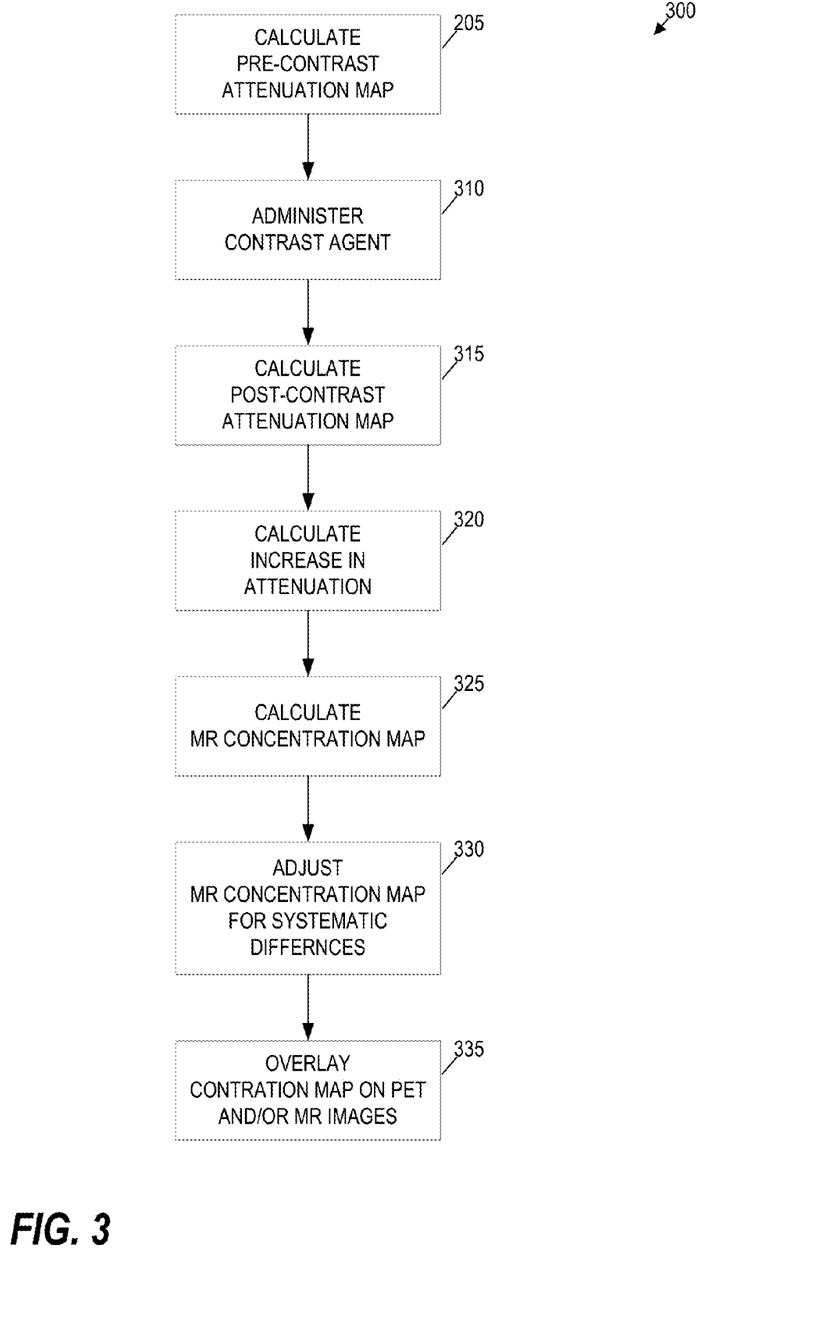
FIG. 3 provides an example process for calculating MR contrast agent concentration based on PET attenuation data.
Figure 4:
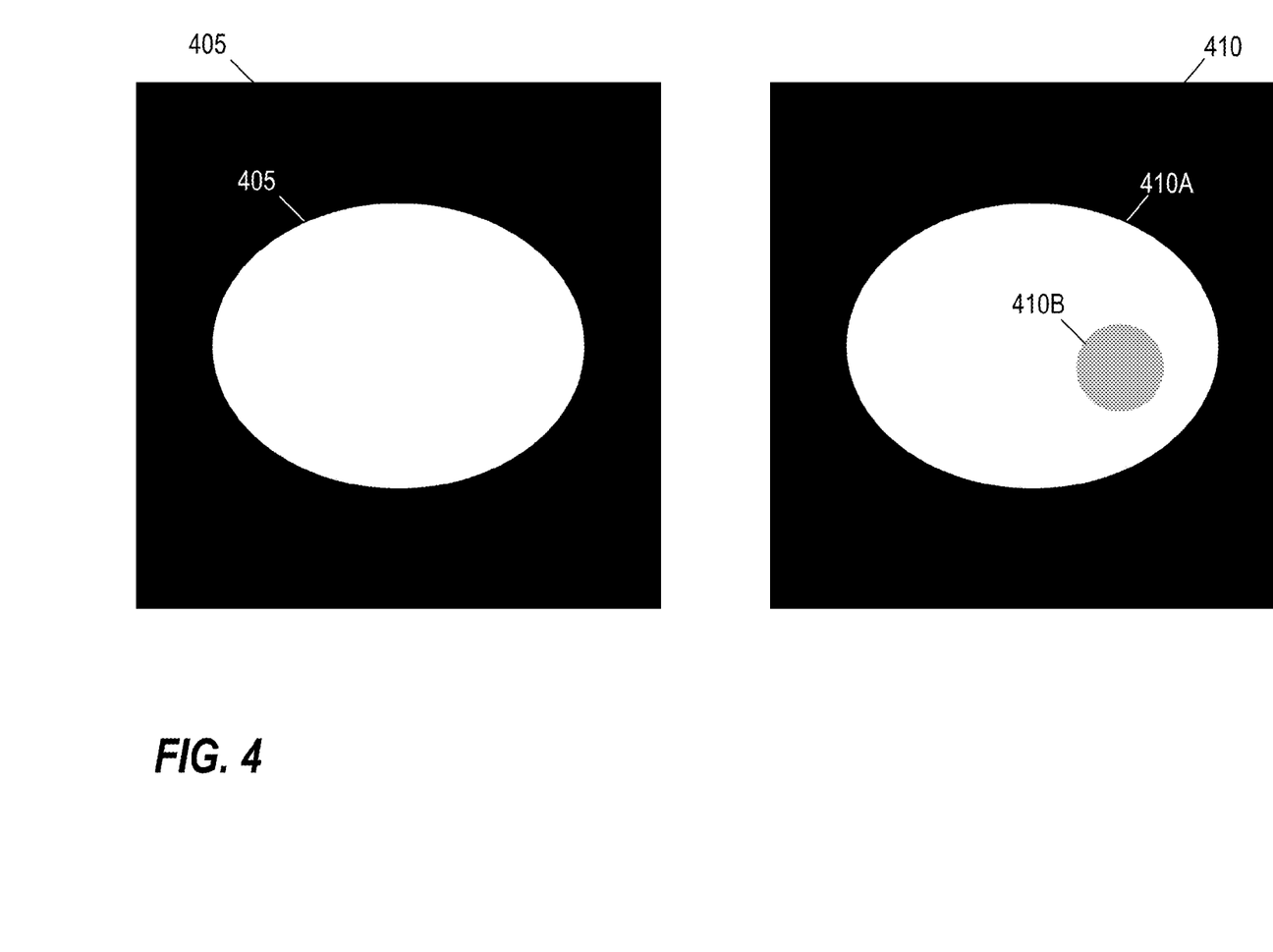
FIG. 4 provides an example of a pre-contrast attenuation map and a post-contrast attenuation map.

FIG. 3 provides an example process 300 for calculating MR contrast agent concentration based on PET attenuation data. This process may be initiated automatically, for example, when new MR image data and/or PET image data is acquired. The process begins at 305 where a pre-contrast attenuation map is calculated. An example pre-contrast attenuation map is shown in FIG. 4 at 405 for a large oval of water 405A. Once the pre-contrast map has been calculated, the MR contrast agent is administered at 310. As is well understood in the art, contrast agents function by altering the magnetic field in a region immediately surrounding a contrast agent molecule. A common kind of MR contrast agent is based on gadolinium, which causes an intense local variation in magnetic susceptibility. In addition, many MR contrast agents, including those based on gadolinium can attenuate high-energy photons.

Next, at 315 a post-contrast attenuation map is derived. In some embodiments, the post-contrast attenuation map is derived using the same technique are used to derived the pre-contrast attenuation map. In other embodiments, the pre- and post-attenuation maps are derived using different techniques. An example post-contrast attenuation map is presented in FIG. 4 at 410. Map 410 shows a large oval of water 410A that does not receive any MR contrast agent and a small sphere of water 410B which does receive the contrast agent. In this example, the gray represents the attenuation of water ($\mu_{pre}$=0.0956 cm$^{-1}$) while the white represents the attenuation of water and a gadolinium-based MR contrast agent ($\mu_{post}$=0.105 cm$^{-1}$). The PET attenuation maps 405, 410 are scaled so that an attenuation of $\Delta\mu$=0.105 cm$^{-1}$ is white.

Returning to FIG. 3, at 320, the increase in attenuation ($\Delta\mu$) is calculated by taking the difference between the pre- and post-contrast attenuation maps. Then, at 325, an MR concentration map is calculated. The change in attenuation determined in 320 is related to the contrast agent C according to the following equation:

$$1 - \frac{\mu_{post}}{\mu_{pre}} = \Delta\mu = \frac{\mu}{\rho}C$$

In this equation, attenuation is represented by μ which has units of cm$^{-1}$. Thus, $\mu_{pre}$ refers to the attenuation before the contrast agent is administered and $\mu_{post}$ refers to the attenuation after the contrast agent is administered. The term $$\frac{\mu}{\rho}$$

refers to the mass attenuation coefficient of the contrast agent, which may have units of mL×g$^{-1}$ cm$^{-1}$. Solving the above equation for the contrast agent term yields:

$$C = \frac{\Delta\mu}{(\mu/\rho)}$$

Figure 5:
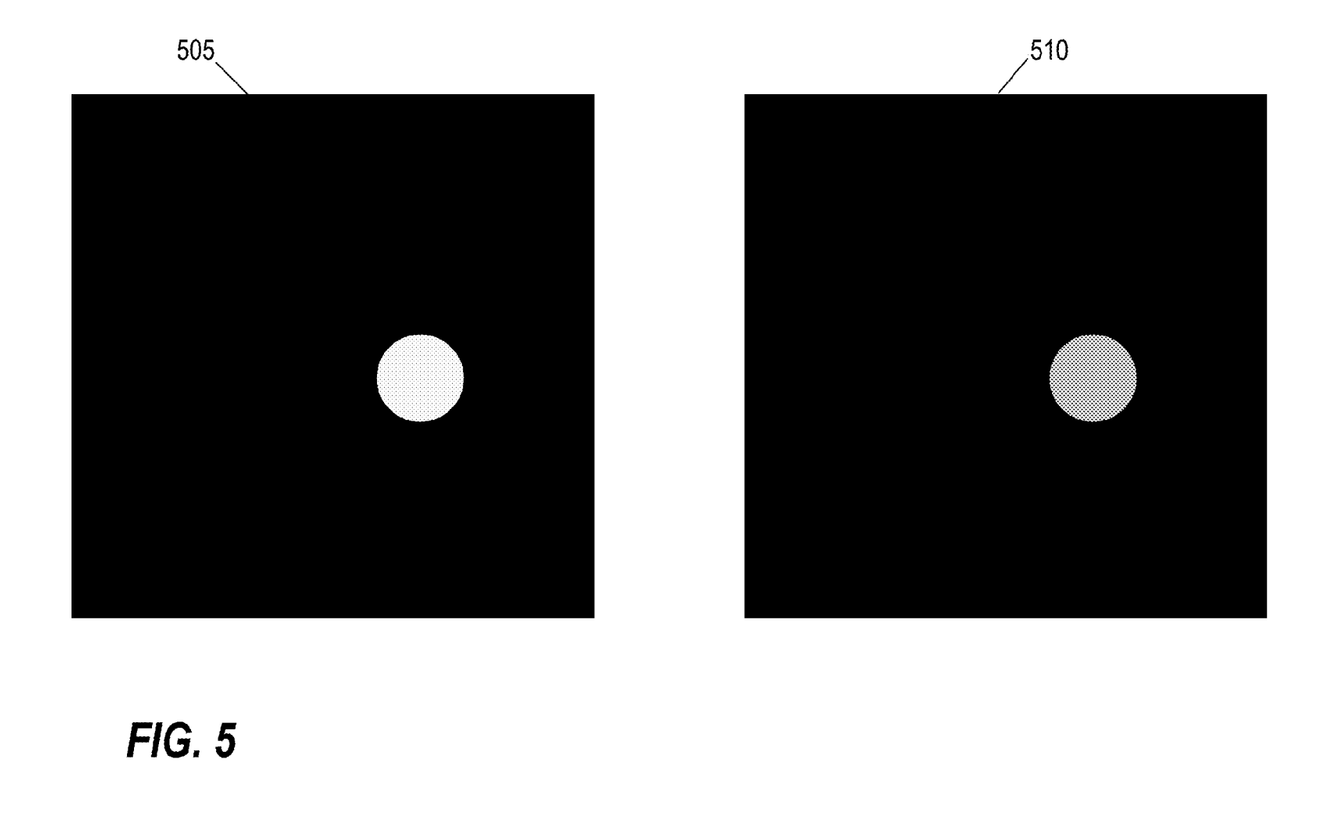
FIG. 5 provides an example of a map of the change in attenuation and a corresponding map of MR contrast agent concentration.

In this equation, C is represented in units of mL$^{-1}$×g. Depending on the units used for each term, other representations may be used. For example, using the molar attenuation of the contrast agent may yield values for the concentration of contrast agent in units of mol/L. FIG. 5 shows an example map of the change in attenuation ($\Delta\mu$) 505 and the corresponding map of MR contrast agent concentration 510. In this example, the PET change in attenuation map 505 is scaled such that a change in attenuation of $\Delta\mu$=0 cm$^{-1}$ is black while a change in attenuation of $\Delta\mu$=0.0096 cm$^{-1}$ is white. The MR contrast agent concentration map 510 is scaled so that a concentration of 0.53 mol/L is gray.

Note that this calculation for the contrast agent set out above assumes that the pre-contrast and post-contrast PET data is the same except for statistical noise and the additional attenuation due to the presence of the contrast agent. This assumption provides a valid approximation, but may not account for other systematic differences between the pre-contrast and post-contrast PET data sets which can be modeled and accounted for. Thus, returning to FIG. 3, at 330 the MR concentration map may be adjusted to account for one or more known systematic differences. Any technique known in the art may be used to adjust for the differences; however the exact technique used may vary according the type of difference being addressed.

For example, since the post-contrast data is acquired later than the pre-contrast data, there may be decay in the PET radiotracer activity. Based on the known half-life of the radiotracer, the change in the PET data due to decay may be calculated and the post-contrast map may be adjusted, for example, using the decay equation: $N=N_0 2^{-t/T}$ where $N_0$ is the activity at the pre-contrast attenuation map, N is the activity at the post-contrast attenuation map, t is the time between the maps, and T is the half-life of the PET tracer. Additionally, if the PET radiotracer tracer has not reached a steady-state biological distribution then the distribution of the tracer may be different in pre- and post-contrast PET data. This could be measured, for example, based on PET tracer kinetics acquired pre-contrast or acquired post-contrast. Then, the post-contrast map may be adjusted, for example to reflect the change in biological distribution between the pre- and post-contrast attenuation maps. Moreover, if the subject has moved, then the data will be different on a per-voxel basis in the pre- and post-contrast PET data. Patient movement could be measured, for example, based on MRI data, either from navigators or from images. Then, one or more motion correction techniques known in the art (e.g., navigator echoes or Periodically Overlapping Parallel Lines with Enhanced Reconstruction) may be used to compensate for the differences. The types of systematic differences that are accounted for vary among the various embodiments of the present invention. That is, some embodiments account for some or all of the systematic differences, while other embodiments do not account for any systematic differences.

Once all known effects have been accounted for, then the remaining differences between the pre- and post-contrast PET data are attributed to the change in attenuation due to the presence of the contrast agent, as described above. At 335, the concentration map is optionally overlaid on PET or MR images. For example, in some embodiments, the MR contrast agent concentration map is presented as an overlay on the PET images. Additionally, in some embodiments where the MR and the PET data have a known spatial relationship, the MR contrast agent concentration map derived from the PET attenuation data may optionally be presented as an overlay on the MR images. Such an overlay may be done, for example, in a user-selectable color scale or with another visual attribute such as, without limitation, highlighting or shading.

Figure 6:
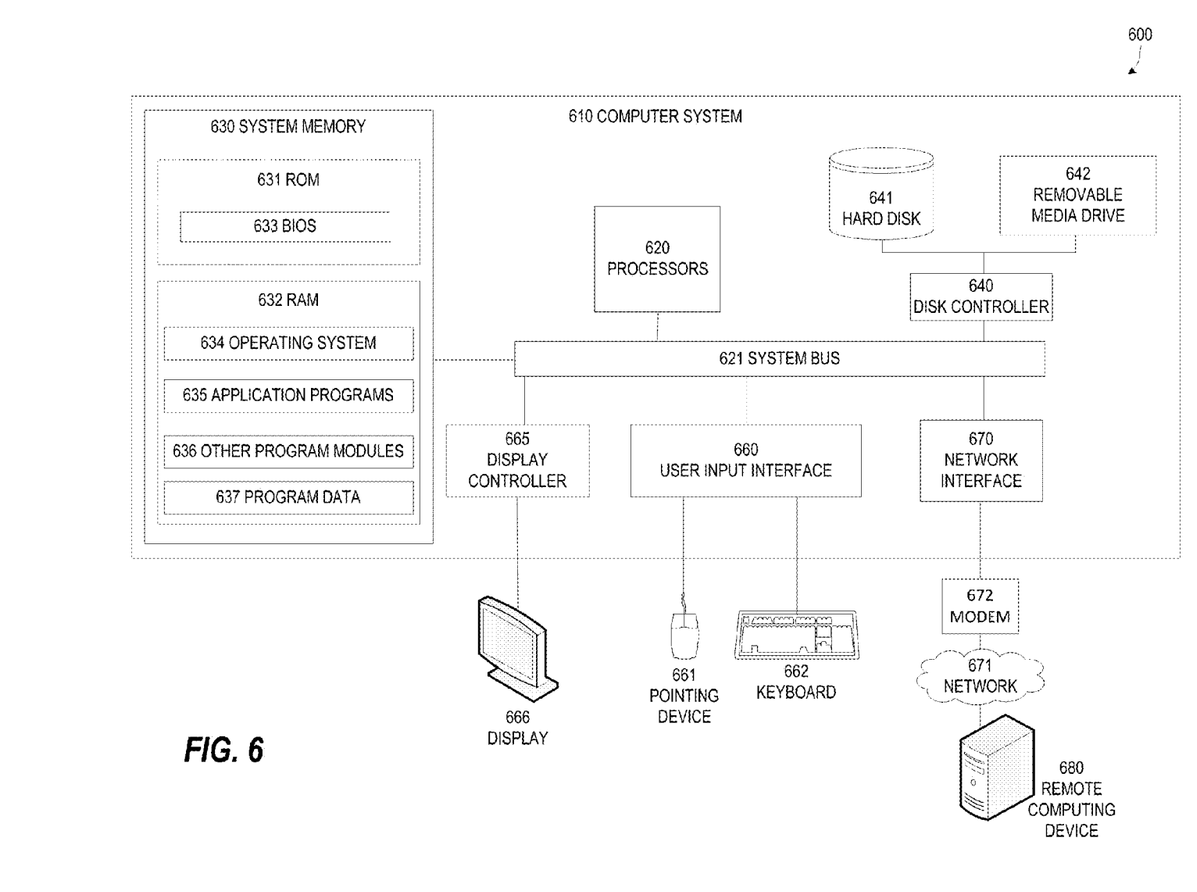
FIG. 6 illustrates an example of a computing environment within which embodiments of the invention may be implemented.

FIG. 6 illustrates an example of a computing environment 600 within which embodiments of the invention may be implemented. Computing environment 600 may include computer system 610, which is one example of a general purpose computing system upon which embodiments of the invention may be implemented. Computers and computing environments, such as computer 610 and computing environment 600, are known to those of skill in the art and thus are described briefly here.

As shown in FIG. 6, the computer system 610 may include a communication mechanism such as a bus 621 or other communication mechanism for communicating information within the computer system 610. The system 610 further includes one or more processors 620 coupled with the bus 621 for processing the information. The processors 620 may include one or more CPUs, GPUs, or any other processor known in the art.

The computer system 610 also includes a system memory 630 coupled to the bus 621 for storing information and instructions to be executed by processors 620. The system memory 630 may include computer readable storage media in the form of volatile and/or nonvolatile memory, such as read only memory (ROM) 631 and/or random access memory (RAM) 632. The system memory RAM 632 may include other dynamic storage device(s) (e.g., dynamic RAM, static RAM, and synchronous DRAM). The system memory ROM 631 may include other static storage device(s) (e.g., programmable ROM, erasable PROM, and electrically erasable PROM). In addition, the system memory 630 may be used for storing temporary variables or other intermediate information during the execution of instructions by the processors 620. A basic input/output system 633 (BIOS) containing the basic routines that help to transfer information between elements within computer system 610, such as during start-up, may be stored in ROM 631. RAM 632 may contain data and/or program modules that are immediately accessible to and/or presently being operated on by the processors 620. System memory 630 may additionally include, for example, operating system 634, application programs 635, other program modules 636 and program data 636.

The computer system 610 also includes a disk controller 640 coupled to the bus 621 to control one or more storage devices for storing information and instructions, such as a magnetic hard disk 641 and a removable media drive 642 (e.g., floppy disk drive, compact disc drive, tape drive, and/or solid state drive). The storage devices may be added to the computer system 610 using an appropriate device interface (e.g., a small computer system interface (SCSI), integrated device electronics (IDE), Universal Serial Bus (USB), or FireWire).

The computer system 610 may also include a display controller 665 coupled to the bus 621 to control a display or monitor 665, such as a cathode ray tube (CRT) or liquid crystal display (LCD), for displaying information to a computer user. The computer system includes an input interface 660 and one or more input devices, such as a keyboard 662 and a pointing device 661, for interacting with a computer user and providing information to the processor 620. The pointing device 661, for example, may be a mouse, a trackball, or a pointing stick for communicating direction information and command selections to the processor 620 and for controlling cursor movement on the display 666. The display 666 may provide a touch screen interface which allows input to supplement or replace the communication of direction information and command selections by the pointing device 661.

The computer system 610 may perform a portion or all of the processing steps of embodiments of the invention in response to the processors 620 executing one or more sequences of one or more instructions contained in a memory, such as the system memory 630. Such instructions may be read into the system memory 630 from another computer readable medium, such as a hard disk 641 or a removable media drive 642. The hard disk 641 may contain one or more datastores and data files used by embodiments of the present invention. Datastore contents and data files may be encrypted to improve security. The processors 620 may also be employed in a multi-processing arrangement to execute the one or more sequences of instructions contained in system memory 630. In alternative embodiments, hard-wired circuitry may be used in place of or in combination with software instructions. Thus, embodiments are not limited to any specific combination of hardware circuitry and software.

As stated above, the computer system 610 may include at least one computer readable medium or memory for holding instructions programmed according embodiments of the invention and for containing data structures, tables, records, or other data described herein. The term "computer readable medium" as used herein refers to any non-transitory, tangible medium that participates in providing instructions to the processor 620 for execution. A computer readable medium may take many forms including, but not limited to, non-volatile media, volatile media, and transmission media. Non-limiting examples of non-volatile media include optical disks, solid state drives, magnetic disks, and magneto-optical disks, such as hard disk 641 or removable media drive 642. Non-limiting examples of volatile media include dynamic memory, such as system memory 630. Non-limiting examples of transmission media include coaxial cables, copper wire, and fiber optics, including the wires that make up the bus 621. Transmission media may also take the form of acoustic or light waves, such as those generated during radio wave and infrared data communications.

The computing environment 600 may further include the computer system 620 operating in a networked environment using logical connections to one or more remote computers, such as remote computer 680. Remote computer 680 may be a personal computer (laptop or desktop), a mobile device, a server, a router, a network PC, a peer device or other common network node, and typically includes many or all of the elements described above relative to computer 610. When used in a networking environment, computer 610 may include modem 662 for establishing communications over a network 661, such as the Internet. Modem 662 may be connected to system bus 621 via user network interface 670, or via another appropriate mechanism.

Network 671 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 610 and other computers (e.g., remote computing system 680). The network 671 may be wired, wireless or a combination thereof. Wired connections may be implemented using Ethernet, Universal Serial Bus (USB), RJ-11 or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 671.

The system and processes of the figures presented herein are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. Further, the processes and applications may, in alternative embodiments, be located on one or more (e.g., distributed) processing devices on a network linking the units of FIG. 1. Any of the functions and steps provided in the Figures may be implemented in hardware, software or a combination of both. No claim element herein is to be construed under the provisions of 35 U.S.C. 112, sixth paragraph, unless the element is expressly recited using the phrase "means for."

The embodiments of the present disclosure may be implemented with any combination of hardware and software. In addition, the embodiments of the present disclosure may be included in an article of manufacture (e.g., one or more computer program products) having, for example, computer-readable, non-transitory media. The media has embodied therein, for instance, computer readable program code for providing and facilitating the mechanisms of the embodiments of the present disclosure. The article of manufacture can be included as part of a computer system or sold separately.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for determining a concentration of a contrast agent in imaging data, the method comprising:
    calculating a pre-contrast attenuation map of a region of interest of a patient;
    following an administering of the contrast agent to the patient, calculating a post-contrast attenuation map of the region of interest of the patient;
    determining whether a PET radiotracer tracer has reached a steady-state biological distribution in the patient, comprising:
        acquiring first PET tracer kinetics prior to the administering of the contrast agent to the patient;
        acquiring second PET tracer kinetics after the administering of the contrast agent to the patient; and
        determining whether the PET radiotracer tracer has reached the steady-state biological distribution by comparing the first PET tracer kinetics with the second PET tracer kinetics; and
    if the PET radiotracer tracer has not reached a steady-state biological distribution, adjusting the post-contrast attenuation map to reflect a change in biological distribution between the pre-contrast attenuation map and the post-contrast attenuation map;
    determining an increase in attenuation value based on the pre-contrast attenuation map and the post-contrast attenuation map; and
    calculating a contrast agent concentration map for the region of interest based on the increase in attenuation value.

2. The method of claim 1, wherein calculating the contrast agent concentration map for the region of interest comprises:
    multiplying the increase in attenuation value by a mass attenuation coefficient corresponding to the contrast agent.

3. The method of claim 1, further comprising:
    adjusting the post-contrast attenuation map to account for one or more systematic differences.

4. The method of claim 1, further comprising:
    determining a decay corresponding to PET radiotracer activity following the calculation of the pre-contrast attenuation map; and
    adjusting the post-contrast attenuation map based on the decay.

5. The method of claim 1, further comprising:
    determining whether the patient moved between the calculating of the pre-contrast attenuation map and the calculating of the post-contrast attenuation map; and
    if the patient moved between the calculating of the pre-contrast attenuation map and the calculating of the post-contrast attenuation map, adjusting the post-contrast attenuation map using a motion correction technique.

6. The method of claim 1, further comprising:
    overlaying the contrast agent concentration map on at least one of a PET image and an MR image.

7. The method of claim 6, wherein the overlaying utilizes user-selectable visual attributes comprising at least one of a color scale, highlighting, and shading.

8. A system for determining concentration of a contrast agent in imaging data, the system comprising:
an input data processor configured to:
generate a first attenuation data prior to an administering of the contrast agent in a patient's body, wherein the first attenuation data comprises a plurality of picture elements, and
generate a second attenuation data after the administering of the contrast agent in the patient's body; and
an image data processor configured to:
determine whether a PET radiotracer tracer has reached a steady-state biological distribution in the patient, comprising:
acquiring first PET tracer kinetics prior to the administering of the contrast agent to the patient;
acquiring second PET tracer kinetics after the administering of the contrast agent to the patient; and
determining whether the PET radiotracer tracer has reached the steady-state biological distribution by comparing the first PET tracer kinetics with the second PET tracer kinetics; and
if the PET radiotracer tracer has not reached a steady-state biological distribution, adjust the first attenuation data to reflect a change in biological distribution between the first attenuation data and the second attenuation data; and
determine a contrast agent concentration associated with at least one of the plurality of picture elements based on the first attenuation data and the second attenuation data.

9. The system of claim 8, wherein the image data processor is further configured to:
receive data representing patient movement; and
correct at least one of the first attenuation data and the second attenuation data based on the data representing patient movement.

10. The system of claim 8, wherein at least one of the first attenuation data and the second attenuation data is estimated in response to acquiring at least one of (a) MR image data and (b) PET image data.

11. The system of claim 8, wherein the image data processor is further configured to determine the contrast agent concentration by:
multiplying a difference between first attenuation data and second attenuation data for the at least one of the plurality of picture elements by a factor representing attenuation of the contrast agent.

12. The system of claim 8, further comprising:
a display processor configured to generate a map comprising the determined contrast agent concentration for said plurality of picture elements.

13. The system of claim 12, wherein the display processor is further configured to:
provide the map as an overlay for presentation in combination with at least one of a PET image and an MR image.

14. An article of manufacture for determining concentration of a contrast agent in imaging data, the article of manufacture comprising a non-transitory, tangible computer-readable medium holding computer-executable instructions for performing a method comprising:
calculating a pre-contrast attenuation map of a region of interest of a patient;
following an administering of the contrast agent to the patient, calculating a post-contrast attenuation map of the region of interest of the patient;
determining whether a PET radiotracer tracer has reached a steady-state biological distribution in the patient, comprising:
acquiring first PET tracer kinetics prior to the administering of the contrast agent to the patient;
acquiring second PET tracer kinetics after the administering of the contrast agent to the patient; and
determining whether the PET radiotracer tracer has reached the steady-state biological distribution by comparing the first PET tracer kinetics with the second PET tracer kinetics; and
if the PET radiotracer tracer has not reached a steady-state biological distribution, adjusting the post-contrast attenuation map to reflect a change in biological distribution between the pre-contrast attenuation map and the post-contrast attenuation map;
determining an increase in attenuation value based on the pre-contrast attenuation map and the post-contrast attenuation map; and
calculating a contrast agent concentration map for the region of interest based on the increase in attenuation value.

15. The article of manufacture of claim 14, wherein calculating the contrast agent concentration map for the region of interest comprises:
multiplying the increase in attenuation value by a mass attenuation coefficient of the contrast agent.

16. The article of manufacture of claim 14, wherein the method farther comprises:
adjusting the contrast agent concentration map for one or more systematic differences.

* * * * *